United States Patent [19]

Niwa et al.

[11] Patent Number: 4,494,957
[45] Date of Patent: Jan. 22, 1985

[54] DYE COMPOSITIONS FOR POLYESTER FIBERS

[75] Inventors: Toshio Niwa; Kiyoshi Himeno, both of Kanagawa; Shuichi Maeda, Saitama, all of Japan

[73] Assignee: Research Association of Synethtic Dyestuffs, Tokyo, Japan

[21] Appl. No.: 493,314

[22] Filed: May 10, 1983

[30] Foreign Application Priority Data

May 17, 1982 [JP] Japan .................................. 57-82788
Feb. 4, 1983 [JP] Japan .................................. 58-17208

[51] Int. Cl.³ .......................... C09B 29/08; D06P 1/04; D06P 3/54
[52] U.S. Cl. ........................................... 8/639; 8/687; 8/922
[58] Field of Search .......................................... 8/639

[56] References Cited

FOREIGN PATENT DOCUMENTS 55-57076 4/1980 Japan .
58-38762 3/1983 Japan .
1239106 7/1971 United Kingdom .
2027733 2/1980 United Kingdom .

Primary Examiner—A. Lionel Clingman
Attorney, Agent, or Firm—Oblon, Fisher, Spivak, McClelland & Maier

[57] ABSTRACT

Dye compositions for dyeing polyester fibers comprise at least one disazo dye represented by the formula (I):

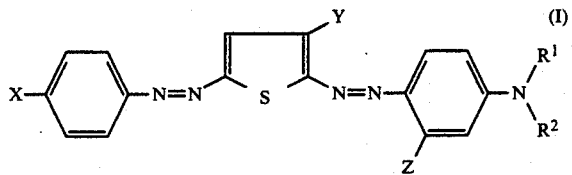

wherein X represents a hydrogen atom, a chlorine atom, a nitro group or a trifluoromethyl group; Y represents a cyano group, an alkoxycarbonyl group or a carbamoyl group; Z represents a hydrogen atom, a chlorine atom, a methyl group, a hydroxyl group, or an alkyl group substituted with a formylamino group or an acylamino group; $R^1$ and $R^2$ each represents a hydrogen atom; a cyclohexyl group; an aryl group; an alkenyl group; an aralkyl group; an alkyl group; or an alkyl group substituted with a hydroxyl group, a lower alkoxy group, a lower alkoxyalkoxy group, a lower alkanoyloxy group, a formyloxy group, a chloro-lower alkanoyloxy group, an aryloyloxy group, an aryloxy group, a lower alkoxycarbonyl group, a lower alkoxyalkoxycarbonyl group, an aralkyloxycarbonyl group, a lower alkoxycarbonyloxy group, a halogen atom, a cyano group, an alkenyloxy group or a tetrahydrofuryl group; and at least one monoazo dye represented by the formula (II):

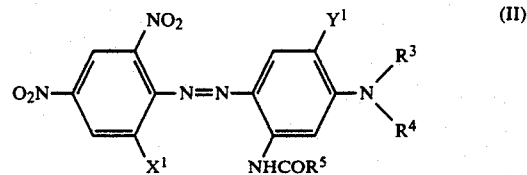

wherein $X^1$ represents a halogen atom; $Y^1$ represents a hydrogen atom, an alkoxy group or an alkoxyalkoxy group; $R^5$ represents a lower alkyl group; $R^3$ and $R^4$ each represents a hydrogen atom, an aryl group, an alkenyl group, a cyclohexyl group, an aralkyl group, an alkyl group, or an alkyl group substituted with a hydroxyl group, a lower alkoxy group, a lower alkoxyalkoxy group, a lower alkanoyloxy group, a chloro-lower alkanoyloxy group, an aryloyloxy group, an aryloxy group, a lower alkoxycarbonyl group, a lower alkoxyalkoxycarbonyl group, an aralkyloxycarbonyl group, a lower alkoxycarbonyloxy group, a halogen atom, a cyano group, an alkenyloxy group or a tetrahydrofuryl group.

5 Claims, No Drawings

DYE COMPOSITIONS FOR POLYESTER FIBERS

FIELD OF THE INVENTION

The present invention relates to dye compositions for polyester fibers and, more particularly, to dye compositions for polyester fibers which can dye polyester fibers clear navy blue with excellent fastness properties, particularly fastness to light, fastness to sublimation, fastness to water, etc., and with good temperature stability and pH stability upon dyeing.

SUMMARY OF THE INVENTION

The object of the present invention is to provide the dye compositions for polyesters comprising at least one disazo dye represented by the formula (I) below:

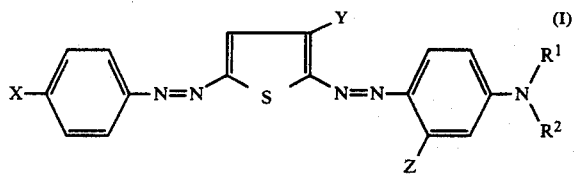

wherein X represents a hydrogen atom, a chlorine atom, a nitro group or a trifluoromethyl group; Y represents a cyano group, an alkoxycarbonyl group or a carbamoyl group; Z represents a hydrogen atom, a chlorine atom, a methyl group, a hydroxyl group, or an alkyl group substituted with a formylamino group or an acylamino group; $R^1$ and $R^2$ each represents a hydrogen atom; a cyclohexyl group; an aryl group; an alkenyl group; an aralkyl group; an alkyl group; or an alkyl group substituted with a hydroxyl group, a lower alkoxy group, a lower alkoxyalkoxy group, a lower alkanoyloxy group, a formyloxy group, a chloro-lower alkanoyloxy group, an aryloyloxy group, an aryloxy group, a lower alkoxycarbonyl group, a lower alkoxyalkoxycarbonyl group, an aralkyloxycarbonyl group, a lower alkoxycarbonyloxy group, a halogen atom, a cyano group, an alkenyloxy group or a tetrahydrofuryl group; and at least one monozao dye represented by the formula (II):

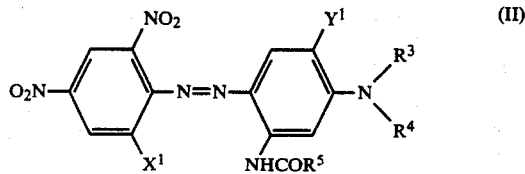

wherein $X^1$ represents a halogen atom; $Y^1$ represents a hydrogen atom, an alkoxy group or an alkoxyalkoxy group; $R^5$ represents a lower alkyl group; $R^3$ and $R^4$ each represents a hydrogen atom, an aryl group, an alkenyl group, a cyclohexyl group, an aralkyl group, an alkyl group, or an alkyl group substituted with a hydroxyl group, a lower alkoxy group, a lower alkoxyalkoxy group, a lower alkanoyloxy group, a chloro-lower alkanoyloxy group, an aryloyloxy group, an aryloxy group, a lower alkoxycarbonyl group, a lower alkoxyalkoxycarbonyl group, an aralkyloxycarbonyl group, a lower alkoxycarbonyloxy group, a halogen atom, a cyano group, an alkenyloxy group or a tetrahydrofuryl group.

DETAILED DESCRIPTION OF THE INVENTION

The compound represented by the formula (I) is a novel disazo dye.

Examples of the acylamino group for Z in the formula (I) includes an acetylamino group, a propionylamino group, a chloroacetylamino group, a benzoylamino group, a methylsulfonylamino group, a chloropropionylamino group, an ethoxycarbonylamino group, an ethylaminocarbonylamino group and the like.

Examples of the aryl group represented by $R^1$, $R^2$, $R^3$ and $R^4$ in the formulae (I) and (II) include a phenyl group, a tolyl group, a chlorophenyl group and the like; examples of the alkenyl group include an allyl group, a crotyl group and the like; and examples of the aralkyl group include a benzyl group, a phenethyl group, a chlorobenzyl group and the like. Examples of the alkyl group represented by $R^1$, $R^2$, $R^3$ and $R^4$ include a methyl group, an ethyl group, a straight or branched chain propyl group, butyl group, pentyl group, hexyl group, heptyl group, octyl group and the like. Examples of the substituted alkyl group represented by $R^1$, $R^2$, $R^3$ and $R^4$ include an alkyl group substituted with a hydroxyl group; a lower alkoxy group such as a methoxy group, an ethoxy group, a butoxy group, etc.; a lower alkoxyalkoxy group such as a methoxyethoxy group, an ethoxyethoxy group, etc.; a lower alkanoyloxy group such as an acetyloxy group, a propionyloxy group, etc.; a chloro-lower alkanoyloxy group such as a chloroacetyloxy group, a chloropropionyloxy group, etc.; an aryloyloxy group such as a benzoyloxy group, etc.; an aryloxy group such as a phenoxy group, etc.; a lower alkoxycarbonyl group such as a methoxycarbonyl group, an ethoxycarbonyl group, etc.; a lower alkoxyalkoxycarbonyl group such as a methoxyethoxycarbonyl group, an ethoxyethoxycarbonyl group, etc.; an aralkyloxycarbonyl group such as a benzyloxycarbonyl group, etc.; a lower alkoxycarbonyloxy group such as a methoxycarbonyloxy group, an ethoxycarbonyloxy group, etc.; a halogen atom such as a chlorine atom, a bromine atom, etc.; an alkenyloxy group such as an allyloxy group, a crotyloxy group, etc., or a tetrahydrofuryl group.

The preferred disazo dyes represented by the formula (I) in the present invention are dyes wherein X represents a chlorine atom or a nitro group, Y represents a cyano group and $R^1$ and $R^2$ represents an alkyl group, a lower alkoxyalkyl group, a lower alkoxycarbonyloxyalkyl group, a lower alkanoyloxyalkyl group or a cyanoethyl group, particularly an ethyl group, a methoxyethyl group, an acetyloxyethyl group or a cyanoethyl group.

The preferred monoazo dyes represented by the formula (II) are dyes wherein $X^1$ represents a bromine atom or a chlorine atom, particularly a bromine atom; $Y^1$ represents a hydrogen atom, a methoxy group, an ethoxy group or a methoxyethoxy group, particularly a hydrogen atom; $R^3$ represents an alkenyl group, an alkyl group, a lower alkoxyalkyl group, a lower alkoxycarbonyloxyalkyl group or a lower alkanoyloxyalkyl group, particularly an alkyl group; $R^4$ represents a hydrogen atom, an alkenyl group, an alkyl group, a lower alkoxyalkyl group, a lower alkoxycarbonyloxyalkyl group, a lower alkanoyloxy alkyl group, a lower alkoxycarbonylalkyl group or a cyanoethyl group, particularly an alkyl group; and $R^5$ represents a methyl group.

The disazo dyes represented by the formula (I) shown above (hereinafter referred to as "disazo dyes (I)") can be produced, for example, by diazotizing an aniline represented by the formula (III):

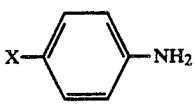

wherein X is the same as defined hereinbefore, coupling the resulting product with a 2-aminothiophene represented by the formula (IV):

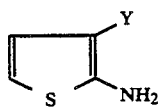

wherein Y is the same as defined hereinbefore, diazotizing the resulting monoazo dye represented by the formula (V):

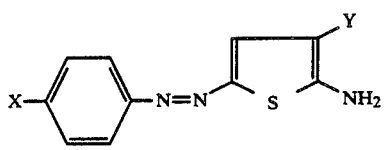

wherein X and Y are the same as defined hereinbefore, and then coupling the resulting product with a diphenylmethane type amine represented by the formula (VII):

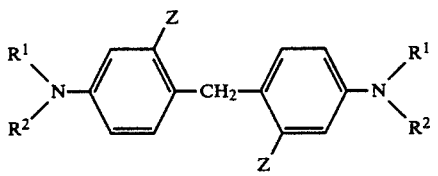

wherein Z, $R^1$ and $R^2$ are the same as defined hereinbefore.

The monoazo dyes represented by the formula (II) shown above (hereinabove referred to as "monoazo dye (II)") are described in Japanese Patent Publication Nos. 20087/64, 24653/64, 25431/65, 2784/65, 5468/66, 34516/71 and 6663/73, Japanese Patent Application (OPI) Nos. 23190/80 and 57076/80 (the term "OPI" as used herein refers to a "published unexamined Japanese patent application"), etc.

The disazo dye (I) and the monoazo dye (II) which are employed as components in the dye composition of the present invention are dyes having a high efficiency, each of which can dye polyester fibers to navy blue with good fastnesses but by dyeing polyester fibers using the composition comprising at least one disazo dye (I) and at least one monoazo dye (II), an absorption rate in a dye bath is markedly improved and a build-up property is also extremely good so that dyed products having a high concentration can easily be obtained and a superfluous loss of dyes is minimized, as compared to the case in which the respective dyes are independently used; thus, the dye composition of the present invention is industrially advantageous.

The number of dye components to be formulated is preferably from 2 to 5 kinds and the proportion of the components is almost the same with respective dyes but, both are not limited thereto but varies depending upon purpose.

The dye composition of the present invention may also be obtained by formulating respective intermediates upon production (diazotization, coupling).

Fibers which can be dyed with the dye composition of the present invention include polyester fibers comprising polyethylene terephthalate, a polycondensate between terephthalic acid and 1,4-bis(hydroxymethyl)-cyclohexane and the like and blended or mixed fibers of the above-described polyester fibers with natural fibers such as cotton, silk, wool, etc.

In dyeing polyester fibers using the dye composition of the present invention, a dye bath or a printing paste is prepared by dispersing the disazo dye (I) and the monoazo dye (II) in an aqueous medium in a conventional manner using a dispersing agent such as a condensate between naphthalenesulfonic acid and formaldehyde, a higher alcohol sulfuric ester or a higher alkylbenzenesulfonate, since both dyes are insoluble or sparingly soluble in water, and dip-dyeing or printing is conducted using the thus-prepared dye-bath or printing paste. For example, in the case of dip-dyeing, polyester fibers or the blended fibers thereof can be dyed with good fastness by employing a conventional dyeing process such as a high temperature dyeing process, a carrier dyeing process or thermosol dyeing process. In this case, addition of an acidic substance such as formic acid, acetic acid, phosphoric acid or ammonium sulfate to the dye-bath in some cases provides better results.

The present invention will now be described in more detail by reference to the following examples of preferred embodiments of the present invention. However, the present invention is not limited thereto.

EXAMPLES 1 TO 13

1 g of disazo dyes (I-1) to (I-17) shown in Table 1 and monoazo dyes (II-1) to (II-II), shown in Table 2 singly or in total in combination as shown in Table 3, was/were dispersed in 3 liters of water containing 1 g of a naphthalenesulfonic acid-formaldehyde condensate and 2 g of higher alcohol sulfuric ester to prepare a dye bath. In this dye bath 100 g of polyester fibers were dipped at 130° C. for 60 minutes to dye, followed by soaping, washing with water and drying. Cloth sample dyed clear blue was obtained. This dyed cloth showed good fastness to light, sublimation and water, and the dye showed good temperature stability and pH stability upon dyeing.

Further the dye of the dyed cloth was dissolved out and extracted with a 0.1% phosphoric acid solution in dimethylformamide and colorimetrically assayed. The dye concentration in Example 1—1 was made 100 and the concentration of the dye of each of the dyed cloth samples was calculated based thereon. The results are shown in Table 3.

TABLE 1

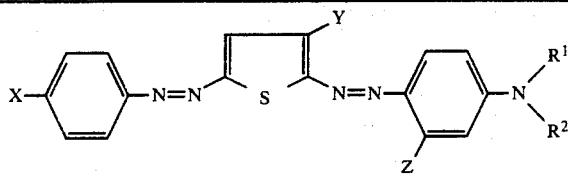

| No. | —X | —Y | —Z | —R¹ | —R² |
|---|---|---|---|---|---|
| (I-1) | —H | —CN | —H | —C$_2$H$_4$OCOCH$_3$ | —C$_2$H$_4$OCOCH$_3$ |
| (I-2) | —NO$_2$ | " | " | —C$_2$H$_5$ | " |
| (I-3) | " | " | " | —C$_2$H$_4$COOCH$_3$ | —C$_2$H$_4$COOCH$_3$ |
| (I-4) | " | " | " | —C$_2$H$_4$OCH$_3$ | —C$_2$H$_4$OCH$_3$ |
| (I-5) | " | " | " | —C$_2$H$_5$ | —C$_2$H$_4$COOCH$_3$ |
| (I-6) | " | " | " | " | —C$_2$H$_4$CN |
| (I-7) | —CF$_3$ | " | " | " | —C$_2$H$_4$OCOCH$_3$ |
| (I-8) | —Cl | " | " | —C$_2$H$_4$OCH$_2$CH=CH$_2$ | —C$_2$H$_4$OCH$_2$CH=CH$_2$ |
| (I-9) | —NO$_2$ | " | —CH$_3$ | —C$_2$H$_5$ | —C$_2$H$_4$OCOCH$_3$ |
| (I-10) | " | " | " | —C$_2$H$_4$OCOCH$_3$ | " |
| (I-11) | —NO$_2$ | —CONH$_2$ | —NHCOCH$_3$ | —C$_2$H$_5$ | —C$_2$H$_5$ |
| (I-12) | " | —COOCH$_3$ | —H | " | —C$_2$H$_4$OCOCH$_3$ |
| (I-13) | —H | —CN | —NHCOCH$_3$ | " | —C$_2$H$_5$ |
| (I-14) | " | " | " | —CH$_3$ | —CH$_3$ |
| (I-15) | " | " | —NHCOC$_2$H$_5$ | " | " |
| (I-16) | " | " | —NHCHO | " | " |
| (I-17) | " | " | " | —C$_2$H$_5$ | —C$_2$H$_5$ |

TABLE 2

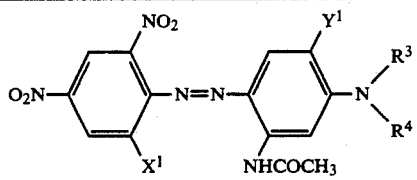

| No. | —X¹ | —Y¹ | —R³ | —R⁴ |
|---|---|---|---|---|
| (II-1) | —Br | —OC$_2$H$_5$ | —C$_2$H$_4$OCOCH$_3$ | —C$_2$H$_4$OCOCH$_3$ |
| (II-2) | —Cl | —OC$_2$H$_4$OCH$_3$ | —H | —CH$_2$CH=CH$_2$ |
| (II-3) | " | " | " | —C$_2$H$_4$OCH$_3$ |
| (II-4) | —Br | —OCH$_3$ | —C$_2$H$_5$ | —C$_2$H$_5$ |
| (II-5) | " | —H | " | " |
| (II-6) | —Cl | —OCH$_3$ | —C$_2$H$_4$OCH$_3$ | —C$_2$H$_4$COOCH$_3$ |
| (II-7) | " | " | " | —C$_2$H$_4$OCH$_3$ |
| (II-8) | " | " | —C$_2$H$_4$OCOCH$_3$ | —C$_2$H$_4$OCOCH$_3$ |
| (II-9) | —Br | " | —C$_2$H$_4$OCOOC$_2$H$_5$ | —C$_2$H$_4$OCOOC$_2$H$_5$ |
| (II-10) | —Cl | " | —C$_2$H$_5$ | —C$_2$H$_4$COOC$_2$H$_4$OCH$_3$ |
| (II-11) | " | —OC$_2$H$_4$OCH$_3$ | " | —C$_2$H$_5$ |

TABLE 3

| Example No. | | Dye Used | | | Concentration |
|---|---|---|---|---|---|
| 1 | 1-1 | (I-1) | 1.0 g | | 100 |
| | 1-2 | (II-1) | 1.0 g | | 80 |
| | 1-3 | (I-1) | 0.5 g | formulated | 150 |
| | | (II-1) | 0.5 g | | |
| 2 | 2-1 | (I-2) | 1.0 g | | 80 |
| | 2-2 | (II-2) | 1.0 g | | 80 |
| | 2-3 | (I-2) | 0.5 g | formulated | 130 |
| | | (II-2) | 0.5 g | | |
| 3 | 3-1 | (I-3) | 1.0 g | | 80 |
| | 3-2 | (II-5) | 1.0 g | | 95 |
| | 3-3 | (I-3) | 0.5 g | formulated | 135 |
| | | (II-5) | 0.5 g | | |
| 4 | 4-1 | (I-5) | 1.0 g | | 90 |
| | 4-2 | (II-5) | 1.0 g | | 95 |
| | 4-3 | (II-4) | 1.0 g | | 90 |
| | 4-4 | (I-5) | 0.5 g | formulated | 150 |
| | | (II-5) | 0.25 g | | |
| | | (II-4) | 0.25 g | | |
| 5 | 5-1 | (I-6) | 1.0 g | | 85 |
| | 5-2 | (II-4) | 1.0 g | | 90 |
| | 5-3 | (II-5) | 1.0 g | | 95 |
| | 5-4 | (I-6) | 0.5 g | formulated | 140 |
| | | (II-4) | 0.25 g | | |
| | | (II-5) | 0.25 g | | |
| 6 | 6-1 | (I-4) | 1.0 g | | 80 |
| | 6-2 | (I-7) | 1.0 g | | 80 |
| | 6-3 | (II-5) | 1.0 g | | 95 |
| | 6-4 | (I-4) | 0.25 g | formulated | 135 |
| | | (I-7) | 0.25 g | | |
| | | (II-5) | 0.5 g | | |
| 7 | 7-1 | (I-8) | 1.0 g | | 80 |
| | 7-2 | (I-9) | 1.0 g | | 90 |
| | 7-3 | (II-3) | 1.0 g | | 95 |
| | 7-4 | (I-8) | 0.5 g | formulated | 135 |
| | | (I-9) | 0.25 g | | |
| | | (II-3) | 0.25 g | | |
| 8 | 8-1 | (I-10) | 1.0 g | | 85 |
| | 8-2 | (I-11) | 1.0 g | | 85 |
| | 8-3 | (II-6) | 1.0 g | | 90 |
| | 8-4 | (I-10) | 0.5 g | formulated | 140 |
| | | (I-11) | 0.25 g | | |
| | | (II-6) | 0.25 g | | |
| 9 | 9-1 | (I-12) | 1.0 g | | 90 |
| | 9-2 | (II-7) | 1.0 g | | 95 |

TABLE 3-continued

| Example No. | | Dye Used | | Concentration |
|---|---|---|---|---|
| 9-3 | (I-12) | 0.5 g | formulated | 150 |
| | (II-7) | 0.5 g | | |
| 10 | 10-1 | (I-13) | 1.0 g | | 80 |
| | 10-2 | (II-5) | 1.0 g | | 95 |
| | 10-3 | (I-13) | 0.4 g | formulated | 140 |
| | | (II-5) | 0.6 g | | |
| 11 | 11-1 | (I-14) | 1.0 g | | 85 |
| | 11-2 | (I-15) | 1.0 g | | 85 |
| | 11-3 | (II-8) | 1.0 g | | 100 |
| | 11-4 | (I-14) | 0.25 g | formulated | 135 |
| | | (I-15) | 0.25 g | | |
| | | (II-8) | 0.5 g | | |
| 12 | 12-1 | (I-16) | 1.0 g | | 85 |
| | 12-2 | (I-17) | 1.0 g | | 85 |
| | 12-3 | (II-9) | 1.0 g | | 95 |
| | 12-4 | (I-16) | 0.5 g | formulated | 140 |
| | | (I-17) | 0.25 g | | |
| | | (II-9) | 0.25 g | | |
| 13 | 13-1 | (I-1) | 1.0 g | | 100 |
| | 13-1 | (II-10) | 1.0 g | | 85 |
| | 13-3 | (II-11) | 1.0 g | | 100 |
| | 13-4 | (I-1) | 0.5 g | formulated | 140 |
| | | (II-10) | 0.25 g | | |
| | | (II-11) | 0.25 g | | |

EXAMPLES 14 TO 23

1 g in total of disazo dyes (I'-1) to (I'-14) shown in Table 4 and monoazo dyes (II') shown by the following structural formula:

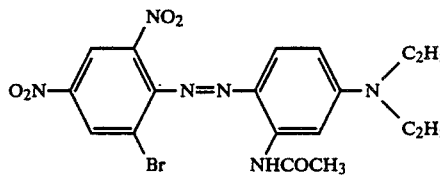

in combination as shown in Table 5 were dispersed in 3 liters of water containing 1 g of a naphthalenesulfonic acid-formaldehyde condensate and 2 g of higher alcohol sulfuric ester to prepare a dye bath. In this dye bath 100 g of polyester fibers were dipped at 130° C. for 60 minutes to dye, followed by soaping, washing with water and drying. Cloth samples dyed clear blue were obtained. This dyed cloth showed good fastness to light, sublimation and water, and the dye showed good temperature stability and pH stability upon dyeing.

Further, the dye of the dyed cloth was dissolved out and extracted with a 0.1% phosphoric acid solution in dimethylformamide and colorimetrically assayed. The dye concentration in Example 16-1 was made 100 and the dye concentration of each of the dyed cloth samples was calculated based thereon. The results are shown in Table 5.

TABLE 4

$$O_2N-\text{C}_6H_4-N=N-\underset{S}{\text{thiophene(CN)}}-N=N-C_6H_4-N\begin{matrix}R^1\\R^2\end{matrix}$$

| No. | $-R^1$ | $-R^2$ |
|---|---|---|
| (I'-1) | —CH$_3$ | —C$_2$H$_4$CN |
| (I'-2) | —C$_2$H$_5$ | " |
| (I'-3) | —C$_3$H$_7$(n) | " |
| (I'-4) | —C$_4$H$_9$(n) | " |
| (I'-5) | —C$_2$H$_4$OCH$_3$ | —C$_2$H$_4$OCH$_3$ |
| (I'-6) | —C$_2$H$_4$OC$_2$H$_5$ | —C$_2$H$_4$OC$_2$H$_5$ |
| (I'-7) | —C$_2$H$_4$OCH$_3$ | —C$_2$H$_4$OCOCH$_3$ |
| (I'-8) | —C$_2$H$_4$OC$_2$H$_5$ | " |
| (I'-9) | —C$_2$H$_4$OCOCH$_3$ | " |
| (I'-10) | —C$_2$H$_4$OCOC$_2$H$_5$ | —C$_2$H$_4$OCOC$_2$H$_5$ |
| (I'-11) | —C$_2$H$_4$OCOOCH$_3$ | —C$_2$H$_4$OCOOCH$_3$ |
| (I'-12) | —C$_2$H$_4$OCOOC$_2$H$_5$ | —C$_2$H$_4$OCOOC$_2$H$_5$ |
| (I'-13) | —C$_2$H$_4$OCH$_3$ | —C$_2$H$_4$OCOOCH$_3$ |
| (I'-14) | —C$_2$H$_5$ | —C$_2$H$_4$OCOCH$_3$ |

TABLE 5

| Example No. | | Dye Used | | Concentration |
|---|---|---|---|---|
| 14 | 14-1 | (I'-2) | 1.0 g | | 85 |
| | 14-2 | (II') | 1.0 g | | 95 |
| | 14-3 | (I'-2) | 0.5 g | formulated | 135 |
| | | (II') | 0.5 g | | |
| 15 | 15-1 | (I'-2) | 1.0 g | | 85 |
| | 15-2 | (I'-7) | 1.0 g | | 100 |
| | 15-3 | (II') | 1.0 g | | 95 |
| | 15-4 | (I'-2) | 0.25 g | formulated | 140 |
| | | (I'-7) | 0.25 g | | |
| | | (II') | 0.5 g | | |
| 16 | 16-1 | (I'-7) | 1.0 g | | 100 |
| | 16-2 | (II') | 1.0 g | | 95 |
| | 16-3 | (I'-7) | 0.5 g | formulated | 140 |
| | | (II') | 0.5 g | | |
| 17 | 17-1 | (I'-14) | 1.0 g | | 90 |
| | 17-2 | (II') | 1.0 g | | 95 |
| | 17-3 | (I'-14) | 0.5 g | formulated | 135 |
| | | (II') | 0.5 g | | |
| 18 | 18-1 | (I'-14) | 1.0 g | | 90 |
| | 18-2 | (I'-5) | 1.0 g | | 90 |
| | 18-3 | (II') | 1.0 g | | 95 |
| | 18-4 | (I'-14) | 0.5 g | formulated | 140 |
| | | (I'-5) | 0.25 g | | |
| | | (II') | 0.25 g | | |
| 19 | 19-1 | (I'-5) | 1.0 g | | 90 |
| | 19-2 | (II') | 1.0 g | | 95 |
| | 19-3 | (I'-5) | 0.5 g | formulated | 135 |
| | | (II') | 0.5 g | | |
| 20 | 20-1 | (I'-5) | 1.0 g | | 90 |
| | 20-2 | (I'-7) | 1.0 g | | 100 |
| | 20-3 | (I'-14) | 1.0 g | | 90 |
| | 20-4 | (II') | 1.0 g | | 95 |
| | 20-5 | (I'-5) | 0.25 g | formulated | 145 |
| | | (I'-7) | 0.25 g | | |
| | | (I'-14) | 0.25 g | | |
| | | (II') | 0.25 g | | |
| 21 | 21-1 | (I'-4) | 1.0 g | | 80 |
| | 21-2 | (I'-9) | 1.0 g | | 40 |
| | 21-3 | (II') | 1.0 g | | 95 |
| | 41-4 | (I'-4) | 0.25 g | formulated | 130 |
| | | (I'-9) | 0.25 g | | |
| | | (II') | 0.5 g | | |
| 22 | 22-1 | (I'-2) | 1.0 g | | 85 |
| | 22-2 | (I'-4) | 1.0 g | | 80 |
| | 22-3 | (I'-8) | 1.0 g | | 90 |
| | 22-4 | (II') | 1.0 g | | 95 |
| | 22-5 | (I'-2) | 0.25 g | formulated | 140 |
| | | (I'-4) | 0.25 g | | |
| | | (I'-8) | 0.25 g | | |
| | | (II') | 0.25 g | | |
| 23 | 23-1 | (I'-7) | 1.0 g | | 100 |
| | 23-2 | (I'-11) | 1.0 g | | 40 |
| | 23-3 | (II') | 1.0 g | | 95 |
| | 23-4 | (I'-7) | 0.3 g | formulated | 130 |
| | | (I'-11) | 0.2 g | | |
| | | (II') | 0.5 g | | |

What is claimed is:

1. A dye composition for dyeing polyester fibers comprising
at least one disazo dye represented by the formula (I):

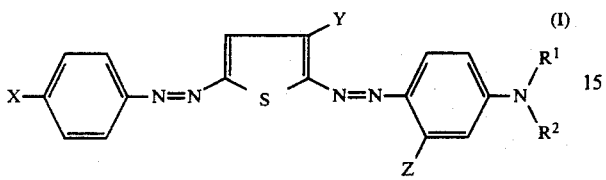

wherein
X represents a hydrogen atom, a chlorine atom, a nitro group or a trifluoromethyl group;
Y represents a cyano group, an alkoxycarbonyl group or a carbamoyl group;
Z represents a hydrogen atom, a chlorine atom, methyl group, a hydroxyl group, or an alkyl group substituted with a formylamino group or an acylamino group;
$R^1$ and $R^2$ each represents a hydrogen atom; a cyclohexyl group; an aryl group; an alkenyl group; an aralkyl group; an alky group; or an alkyl group substituted with a hydroxyl group, a lower alkoxy group, a lower alkoxyalkoxy group, a lower alkanoyloxy group, a formyloxy group, a chloro-lower alkanoyloxy group, an aryloxyloxy group, an aryloxy group, a lower alkoxycarbonyl group, a lower alkoxyalkoxycarbonyl group, an aralkyloxycarbonyl group, a lower alkoxycarbonyloxy group, a halogen atom, a cyano group, an alkenyloxy group or a tetrahydrofuryl group; and
at least one monoazo dye represented by the formula (II):

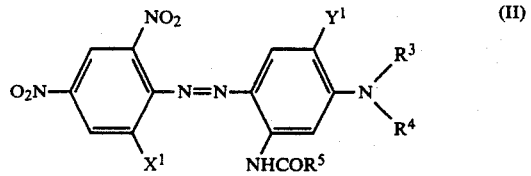

wherein
$X^1$ represents a halogen atom;
$Y^1$ represents a hydrogen atom, an alkoxy group or an alkoxyalkoxy group;
$R^5$ represents a lower alkyl group;
$R^3$ and $R^4$ each represents a hydrogen atom, an aryl group, an alkenyl group, a cyclohexyl group, an aralkyl group, an alkyl group, or an alkyl group substituted with a hydroxyl group, a lower alkoxy group, a lower alkoxyalkoxy group, a lower alkanoyloxy group, a chloro-lower alkanoyloxy group, an aryloyloxy group, an aryloxy group, a lower alkoxycarbonyl group, a lower alkoxyalkoxycarbonyl group, an aralkyloxycarbonyl group, a lower alkoxycarbonyloxy group, a halogen atom, a cyano group, an alkenyloxy group or a tetrahydrofuryl group; the proportion of said monoazo dye and said disazo dye in said composition being about 25:75 to 75:25.

2. The dye composition as claimed in claim 1, wherein the disazo dye represented by the formula (I) is the dye wherein X represents a chlorine atom or a nitro group, Y represents a cyano group and, $R^1$ and $R^2$ represent an alkyl group, a lower alkoxyalkyl group, a lower alkoxycarbonyloxyalkyl group, a lower alkanoyloxyalkyl group or a cyanoethyl group.

3. The dye composition as claimed in claim 1, wherein the disazo dye represented by the formula (I) is the dye wherein X represents a chlorine atom or a nitro group, Y represents a cyano group, Z represents a hydrogen atom, $R^1$ and $R^2$ represent an ethyl group, a methoxyethyl group, an acetyloxyethyl group or a cyanoethyl group.

4. The dye composition as claimed in claim 1, wherein the monoazo dye represented by the formula (II) is the dye wherein $X^1$ represents a bromine atom or a chlorine atom, $Y^1$ represents a hydrogen atom, a methoxy group, an ethoxy group or a methoxyethoxy group, $R^3$ represents an alkenyl group, an alkyl group, a lower alkoxyalkyl group, a lower alkoxycarbonyloxyalkyl group or a lower alkanoyloxyalkyl group, $R^4$ represents a hydrogen atom, an alkenyl group, an alkyl group, a lower alkoxyalkyl group, a lower alkoxycarbonyloxyalkyl group, a lower alkanoyloxyalkyl group, a lower alkoxycarbonylalkyl group or a cyanoethyl group, and $R^5$ represents a methyl group.

5. The dye composition as claimed in claim 1, wherein the monoazo dye represented by the formula (II) is the dye wherein $X^1$ represents a bromine atom, $Y^1$ represents a hydrogen atom, $R^3$ and $R^4$ represent an alkyl group, and $R^5$ represents a methyl group.

* * * * *